3,332,867
CONDUCTIVE ADHESIVE BONDING OF A GALVANIC ANODE TO A HULL

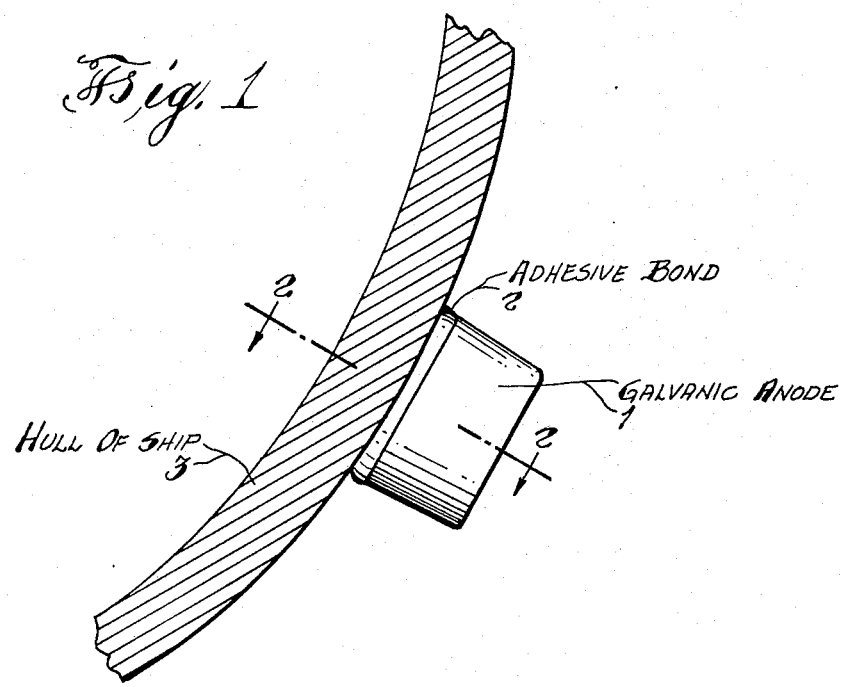
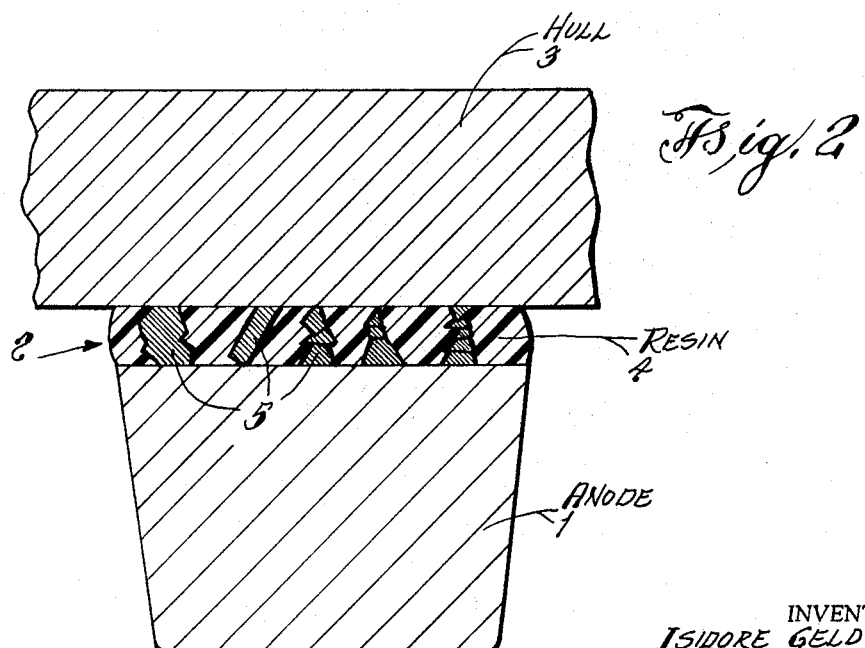

Walter L. Miller, 160 Hendrickson Ave., Lynbrook, N.Y. 11563, and Isidore Geld, 56—11 184th St., Flushing, N.Y. 11365
Filed Oct. 3, 1963, Ser. No. 313,712
2 Claims. (Cl. 204—197)

The invention described herein may be manufactured and used by or for the Government of the United States of America for governmental purposes without the payment of any royalties thereon or therefor.

This invention relates to the bonding together face to face of two electrically conducting bodies, such as, for example, the securing of a galvanic or zinc anode to the metal hull of a ship. The use of bolts, screws and galvanized anode straps creates hydrodynamic problems, especially with rapidly moving ships, and current may leak to inadequately painted bolt threads and unpainted strap undersides of degalvanized areas, thus lowering anode efficiency. The welding of anodes to hulls does not eliminate the necessity for anode straps and may effect the hull strength.

Electrically conductive adhesives have been made by adding large percentages of fine metal particles, substantially colloidal in size, to organic binders, but they are conductive only when very large percentages, such as up to 90%, of the metal particles are present, so that they do not have high mechanical strength, are usually expensive and have been limited in use largely to small specialized applications such as instruments.

Objects of this invention are to provide a simple, practical, strong, inexpensive, efficient and durable electrically conducting, adhesive bond between abutting faces of two metal or electrically conducting bodies, which will not weaken the hull when used to secure galvanic anodes to ships' hulls, with which the electrical resistance offered between the adhesively coupled metals by the adhesive bond may be made a minimum, and which will provide a strong mechanical bond between the joined metal bodies.

Other objects and advantages will appear from the following description of some examples of the invention and the novel features will be particularly pointed out in connection with the appended claims.

In the accompanying drawing:

FIG. 1 is a section of a ship's hull with a galvanic anode in elevation and cemented to the hull in accordance with this invention; and FIG. 2 is a sectional plan of the same on a larger scale, the section being taken approximately along the line 2—2 of FIG. 1.

In accordance with this invention, two electrically conducting bodies, such as of metals, may be coupled face to face by a normally nonconducting adhesive bonding agent, such as a matrix of organic adhesive, in which are incorporated and distributed loose, discrete, relatively coarse granules of an electrically conducting material, such as of metals or carbon, of substantial size and preferably irregular shape so that when the metals or bodies to be coupled or bonded together with the new granule loaded adhesive interposed between them are pressed together, the granules will contact with the bodies and with one another and establish a relatively low resistance electrical path between the bodies and occupy only a minor part of the space between the bodies. The viscosity of the adhesive should be high enough to keep the granules in suspension and a substantial and preferably major portion of the granules should be large enough to establish the electrical path and still leave adequate adhesive to provide adequate adhesion to the bodies being joined. By using larger granules and in an amount to form less than about half the weight of the adhesive and granules mixture, the adhesive will be adequate to form a very strong bond between the bodies being joined. For example, a mixture containing 10% by weight of metal or carbon granules that will be considered 30 mesh screen size in an epoxy resin adhesive has been found to be satisfactory. One use for this invention is in joining a galvanic or zinc anode to the exterior surface of a vessel hull to provide cathodic protection for the vessel, and the invention will be described and illustrated, by way of example, in connection with such use, but it will be understood that the invention broadly has other uses in joining any two approximately abutting, electrically conducting bodies by an electrically conducting adhesive or cement, such as for electrical or electronic equipment where it is not feasible to solder or weld.

In the drawings, a galvanic or zinc anode 1 is cemented or secured by an adhesive layer 2 to the exterior surface of the metal hull wall 3 of a ship. Previously, mechanical devices such as bolts and straps have been used to join the anode to the hull wall, but the new adhesive layer 2 not only firmly bonds the anode to the hull wall but provides a good, strong, low resistance electrical path between the anode and the hull wall. As illustrated in FIG. 2, the layer 2 is formed of a layer of good adhesive bonding agent 4 in which is incorporated and distributed a plurality of relatively coarse granules 5 of electrically conducting material such as metal or carbon granules. For use in joining anodes to a ship's hull, the granules may advantageously be metallic zinc granules.

The adhesive should be sufficiently viscous to hold the granules in suspension therein, but not so viscous that it will not readily receive therein the electrically conducting granules. Any good bonding adhesive may be used which will provide the desired strength of the bond, which does not react with the metals or bodies to be joined, or with the granules. An excellent bonding agent or adhesive for this purpose is an epoxy adhesive resin available in the market, such as of the type obtained in the reaction of epichlorohydrin and a diphenyl such as bisphenol A. A large variety of these epoxy resins are available in the market.

The shape of the granules preferably should be irregular with relatively sharp edges and of substantial thickness rather than particles of films, so that when the bodies are pressed together with the granule-loaded adhesive between them, the granules will contact with the bodies and with one another at intervals throughout the adhesive layer and establish a good electrically conducting path between the bodies being connected. If the granules are coarser, a lesser number in a given layer will be necessary to establish the electrically conducting path between the bodies, such as between the anode 1 and the hull wall 3, and still leave ample space between the granules for the adhesive to occupy and provide a strong mechanical union between the anode and the hull wall. When the granules are very fine, a greater percent of them in the bonding agent is necessary to provide a good, low-resistance path between the anode and the hull wall, which leaves less space for the adhesive and consequently there is a much lower mechanical strength in the bond. Granules as small as 80 mesh screen size are about as fine as profitably may be used and preferably should be larger. Granules of 40 mesh screen size have given excellent results as have those of 20 mesh screen size. If granules or particles much larger than those of a 10 mesh screen size are used, they will provide the necessary electrically conducting path between the anode and the hull wall, but create a thickness in the bonding agent which may at times be undesirable. The upper limit as to size of the granules will be determined by the permissible thickness of the bonding agent.

The granules need not be all of the same size but a substantial and preferably major portion of the granules should be relatively coarse, so that the fines of the granules will not prevent the presence of sufficient adhesive or bonding agent between the particles to provide the desired mechanical strength in the bond between the anode and hull wall. Pressure between the bodies to be secured together is important and should be applied and continued during the curing or hardening of the adhesive bonding agent in order to hold the granules in contact with the faces of the bodies and with one another to establish and maintain the low resistance, electrically conducting path between the bodies being secured together.

Zinc granules are very satisfactory, plentiful and quite inexpensive. Tin granules appear to provide the best conductivity but are more expensive than zinc and in a national emergency might be more difficult to obtain. Granules of aluminum, iron, and lead are not as electrically conductive as zinc and tin possibly due to the presence of oxide films thereon. Carbon granules are inexpensive and provide good conductivity. One very satisfactory example is to use 10 parts by weight of 30 mesh metallic zinc granules in 100 parts by weight of an epoxy type resin adhesive bonding agent, cured between the metal bodies under a pressure between the bodies of about 5 lbs. per sq. in. Unlike finely ground particles, the larger granular particles tend to occlude and become wedged together, thereby giving good electrical conductivity. The adhesive carrying these larger particles by itself is nonconducting to start with, even when cured, but it becomes electrically conductive when this adhesive, uncured, with coarse conducting granules therein is placed between two conducting surfaces, with some pressure urging the surfaces together, and cured while under such pressure. Resistances of less than 0.001 ohm per square inch of surface have been obtained in such a bonding. The joint is not limited to a single layer of metal particles and may optionally have the thickness of two or more granules. While the granules may be of any shape, those with irregular faces of sharp corners or edges, when used in the adhesive, require only a low pressure between the bodies during curing or hardening of the cement or adhesive in order to obtain good electrical conductivity, whereas if the surfaces of the interponent conducting particles have smooth surfaces, a much higher pressure between the bodies being joined is necessary in order to obtain an equally good electrical conductivity through the bonding layer. By the term granules, as used herein, we intend to define relatively coarse particles of conducting material which are of irregular shapes, some with sharp edges, and larger than about 80 mesh screen size. The quantity of granules used will preferably be less than one half, by weight, of the weight of the mixture of adhesive and granules. Substantially all of the granules should be as large or larger than about 80 mesh screen size. The thickness of the bonding layer is preferably between about 1 and 1½ the thickness of the largest granules contained in the layer.

The 80 mesh screen size of granules is about 7 mils or 0.0070 inch across it, and 60 mesh screen size granules are about 10 mils across them.

It will be understood that various changes in the details, materials and steps, which have been herein described and illustrated in order to explain the nature of the invention, may be made by those skilled in the art within the principle and scope of the invention as expressed in the appended claims.

We claim:

1. In the cathodic protection of ships' hulls, wherein a galvanic anode is bonded to a ship's hull by an electrically conducting, adhesive bonding agent interposed between the hull and the anode, that improvement in said interposed agent which comprises:
   (a) a layer of a cured resin electrically nonconducting bonding agent disposed between and spacing said anode and hull and bonded to said anode and said hull, and
   (b) electrically conducting coarse granules of irregular shapes with sharp edges and of approximately 30 mesh screen size distributed through said agent and forming approximately 10 percent by weight of the mixture of agent and granules, said agent having a thickness of between 1 and 1½ times the thickness of the largest granules therein, and said granules contacting at intervals said anode and hull forming electrically conducting paths between said anode and hull.

2. The improvement according to claim 1 wherein:
   (a) said agent is obtained by the reaction between epichlorohydrin and bisphenol A, and
   (b) the granules are of metallic zinc.

References Cited

UNITED STATES PATENTS

| | | | |
|---|---|---|---|
| 2,423,290 | 7/1947 | Bonwitt | 204—148 |
| 2,072,558 | 1/1963 | Myers et al. | 204—280 |
| 3,140,342 | 7/1964 | Ehrreich et al. | 174—35.2 |
| 3,157,735 | 11/1964 | Stroup et al. | 252—512 |
| 3,202,596 | 8/1965 | Canevari | 204—197 |

OTHER REFERENCES

Delmonte, "Metal-Filled Plastics," 1961, pp. 68–71.

JOHN H. MACK, *Primary Examiner.*

T. H. TUNG, *Examiner.*